United States Patent [19]

Stikeleather

[11] 4,187,710
[45] Feb. 12, 1980

[54] METHOD AND APPARATUS FOR SIMULTANEOUSLY ROLLING AND SLITTING METAL STRIP

[75] Inventor: Allan Stikeleather, Canton, Mass.

[73] Assignee: Industrial Blast Coil Corporation, South Easton, Mass.

[21] Appl. No.: 914,447

[22] Filed: Jun. 12, 1978

[51] Int. Cl.$^2$ .............................................. B21B 1/00
[52] U.S. Cl. ............................................... 72/204
[58] Field of Search ................... 72/204, 129, 199, 334, 72/325, 366, 186

[56] References Cited

U.S. PATENT DOCUMENTS

| 87,557 | 3/1869 | Fowler | 72/204 |
| 281,184 | 7/1883 | Greer | 72/204 |
| 451,002 | 4/1891 | Harris | 72/204 |

FOREIGN PATENT DOCUMENTS 51-20754  2/1976  Japan ............................... 72/204

*Primary Examiner*—Milton S. Mehr
*Attorney, Agent, or Firm*—Parmelee, Johnson, Bollinger & Bramblett

[57] ABSTRACT

Metal strip is slit by passage between a pair of rollers which are flanged and mate together in close tolerance interfitting relationship to completely contain and confine the strip cross section. The rollers compressively work the full width of the strip, thereby significantly reducing its thickness. The working portions of each of the rolls have at least two neighboring roll surfaces which are offset in a direction radially with respect to their axes of rotation, i.e., in a "stepped" relationship, the amount of offset being sufficiently great for simultaneously separating the strip into at least two resultant substrips while the thickness of the substrips is being significantly reduced. Both edges of each of the resultant substrips have an attractively polished appearance without sharpness or burr, and the substrips are produced without camber.

25 Claims, 5 Drawing Figures

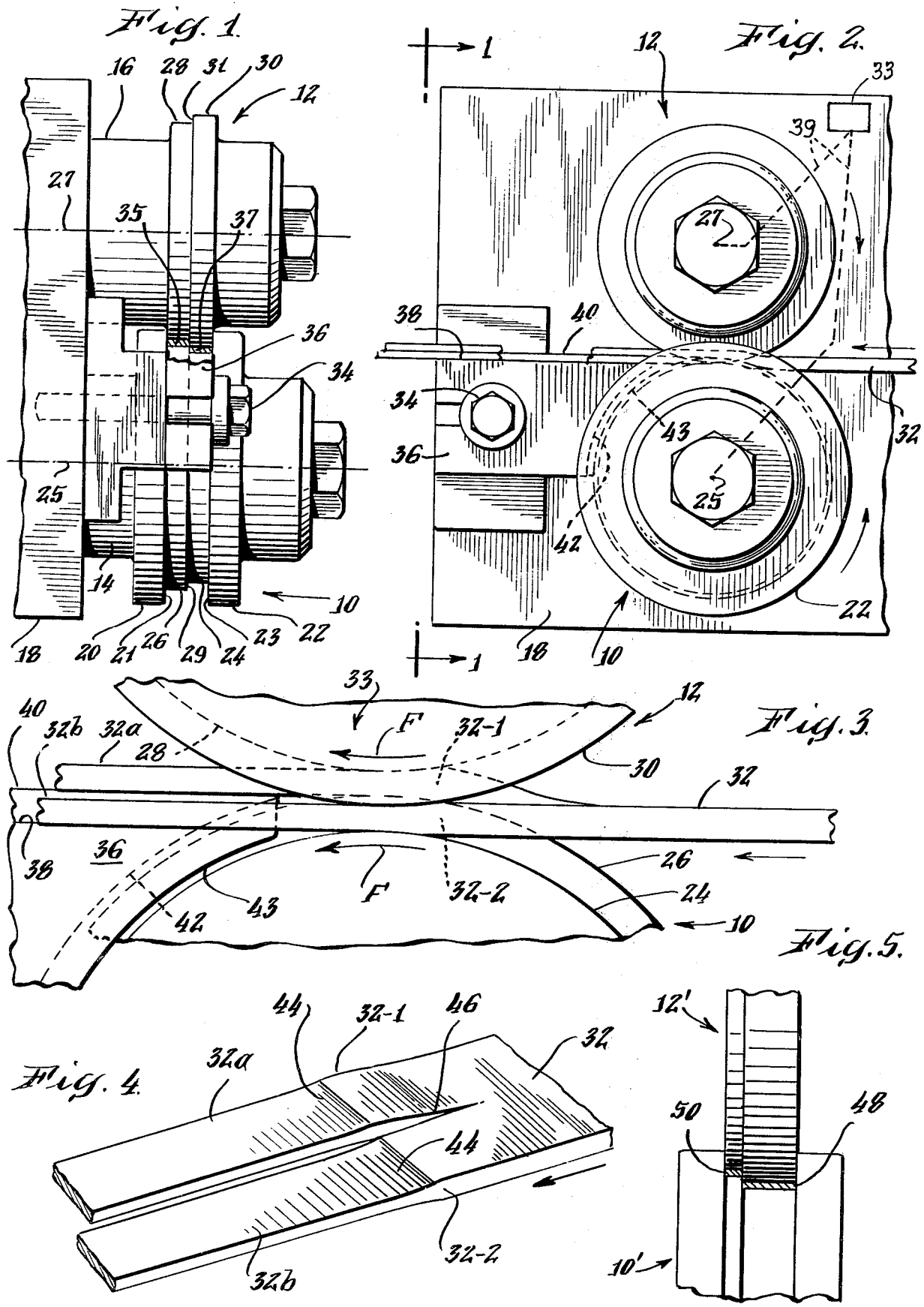

METHOD AND APPARATUS FOR SIMULTANEOUSLY ROLLING AND SLITTING METAL STRIP

BACKGROUND OF THE INVENTION

This invention pertains to the art of metal rolling. More particularly, it relates to the slitting of metal strip of predetermined width and thickness as the last step or as an intermediate step in one or more rolling operations.

Metal which has been rolled to a given thickness in a rolling mill must often be sized to the desired width by a final slitting operation to obtain a finished product of the proper dimensions. The conventional slitting operation, however, introduces a number of problems and undesirable results. It would be preferable (if possible) to slit the metal strip along closely adjacent to one edge to thereby reduce waste by minimizing the amount of trimmed metal which must be recycled. In other words, the portion of the strip which is trimmed off must be recycled by being remelted and again passed through the rolling mill. Such recycling of metal causes a wastage of time, labor and energy. In a typical conventional installation several percent of the throughput of the strip mill must be recycled, which recycled percentage increases with narrowing strip width. This recycling means that the actual useful output at best is only ninety-odd percent of the mill capacity.

However, the slitting operation constitutes cold working of the metal in the localized region bordering upon the slit edge, thereby changing its internal structure and physical properties along the slit edge. The slitting imparts a squeezing or compressive working effect bordering closely to the slit edge. As a result of these non-uniform effects, the physical properties become different along and adjacent to the slit edge of the strip as compared with its remaining cross sectional area, which remains essentially undisturbed by a conventional slitting operation. This conventional slitting of only one edge of a metal strip results in a condition known as "camber," a tendency of the metal strip to assume a sideways or lateral curvature upon leaving the slitter. The strip having camber curves sideways in a direction away from its slit edge, that is, the slit edge is convex as seen looking longitudinally along the strip.

In order to avoid the problem of camber, it is customary to trim metal strip to its desired finished width by simultaneously slitting along both edges. This dual edge trimming has the effect of increasing the quantity of waste metal which must be recycled. In addition to the problem of camber, conventional trimming also results in poor edge profile, edge roughness, and edge sharpness or burr. One of these latter problems is corrected by the trimming of two edges rather than one. When both edges are simultaneously trimmed, the problem of camber may be overcome, but both of the trimmed edges are now likely to exhibit these undesirable characteristics of poor edge quality. They often require subsequent polishing or burr removal treatment.

Finally, it is to be noted that a dual edge trimmed strip is non-uniform. The regions bordering closely to both slit edges are work hardened as compared with the main body of the metal in the strip.

Still another problem created by the use of a conventional slitter is that take-up rolls are required to pull the strip through slitting knives. Therefore, in addition to the number of rolling stands in the mill itself, there must also be a slitting line which usually includes pay-off mechanism feeding the strip into slitting knives with a take-up (or pulling) arrangement downstream from the slitting knives. This need for a separate slitting line increases the overall complexity and cost of the installation and requires additional floor space. Finally, for higher quality production, there is the edge polishing, burr removal, or other equipment for upgrading the rough, sharp edges to be of acceptable quality.

Another problem of conventional slitting is that the material to be slit is required to have sufficient yield strength to withstand any need for being pulled through the slitter knives under tension. Otherwise, strip of low yield strength may become elongated and stretched and thereby lose dimensional tolerance in the resulting slit strips.

SUMMARY OF THE INVENTION

The method of slitting one metal strip of predetermined thickness and a width at least several times its thickness into at least two resultant substrips comprises compressively working the strip along its entire width, thereby reducing its thickness. Simultaneously, the strip is separated along a plane perpendicular to its major surfaces and parallel to its longitudinal center line.

The present invention in one of its aspects includes the method of simultaneously rolling metal strip while parting it into at least two resultant substrips comprising providing a work strip of malleable metal having a predetermined width and thickness, with its width being at least several times greater than its thickness, introducing one end of the strip into a confining rolling zone, driving the metal of the strip longitudinally through the rolling zone by applying longitudinally directed rolling forces to the metal in the rolling zone. In the rolling zone, at least two longitudinal portions of the strip are displaced relatively transversely with respect to each other in a direction generally perpendicularly to the plane of the work strip, and in the rolling zone the entire cross-sectional area of the metal is effectively confined while significantly reducing the thickness of each of these longitudinal portions and while continuing transversely displacing these longitudinal portions relative to each other for parting them into multiple substrips issuing from said rolling zone. These substrips are each thinner than the initial work strip, and the sum of their cross-sectional areas is significantly less than the cross-sectional area of the work strip upstream from said rolling zone, whereby the work strip is parted into at least two resultant substrips each of which is thinner than the work strip and each of which is travelling downstream from the rolling zone without commercially unacceptable camber.

Among the advantages of the present invention are those resulting from the following beneficial conditions:

1. The capacity of a strip mill of given size is increased by a commercially important factor of several percent, which becomes an increasing percentage as the total width of the initial strip is decreased.

2. Less energy is needed to operate the mill for a given output production, because recycling is avoided.

3. The amount of energy required to heat the accompanying melting furnaces is markedly reduced because it is no longer necessary to recycle edge trimmings.

4. The stand embodying the invention for parting the metal strip serves multiple novel functions.

5. The need for a separate slitting line is eliminated. Thus, the complexity and expense of the installation as a whole is reduced. The installation becomes more compact overall and floor space is conserved.

6. Regardless of whether the metal may have a low yield strength, dimensional tolerance of the output strip is assured, because they are not being pulled through slitting knives by a pulling arrangement.

7. Both edges of each of the resulting substrips have a commercially attractive and acceptable generally polished appearance, without roughness, edge sharpness or burr.

8. The need for subsequent treatment equipment for upgrading the strip edge quality is eliminated.

9. In summary, the cost and size of the strip making installation are reduced while its productivity is increased and its energy requirements are reduced, and also the energy requirements of the accompanying furnace equipment are reduced for a given output, thereby being a synergistic techological breakthrough of paramount importance.

The various features, aspects and advantages of the present invention will become more fully understood from a consideration of the following detailed description of presently preferred embodiments of this invention in conjunction with the accompanying drawings.

BRIEF DESCRIPTION OF THE DRAWINGS

FIG. 1 is an elevational view of a pair of stepped, interfitting mating rolls defining a confining rolling zone embodying the invention, the resultant metal substrips being shown in cross section therebetween; this view is taken looking upstream in a direction parallel to the pass line, as seen looking from the position 1—1 in FIG. 2;

FIG. 2 is a side elevational view of the rolls of FIG. 1, as seen looking in a direction parallel with the roll axis.

FIG. 3 is an enlarged view of the nip portion between the rolls illustrating their confining rolling action on a metal strip;

FIG. 4 is a perspective view of a portion of metal strip which has been removed from the confining rolling zone after passing partially through and illustrating the results of employing the invention; and, FIG. 5 is a partial view similar to FIG. 1 and showing another pair of stepped, interfitting mating rolls defining a confining rolling zone embodying the invention for producing two resultant substrips of different widths.

DESCRIPTION OF THE PREFERRED EMBODIMENTS

With particular reference to FIGS. 1 and 2, there are illustrated a pair of driven rolls having stepped, interfitting mating configuration defining a confining rolling zone embodying the invention and comprising a female roll 10 and a male roll 12 mounted for rotation by their respective shafts 14, 16 from a common housing 18. Female roll 10 is characterized by a pair of axially spaced disk-like flanges 20, 22. These flanges 20 and 22 have inner surfaces 21 and 23, respectively which face in an axial direction toward each other, these inner surfaces 21 and 23 being smooth and flat and each extending perpendicularly to the axis 25 of the roll 10. Between the flanges 20, 22 are a pair of cylindrical metal working roll surfaces, a smaller diameter surface 24, and a larger diameter surface 26.

The male roll 12 comprises a pair of adjacent, cylindrical metal working roll surfaces including a smaller diameter surface 28 and a larger diameter surface 30. These male roll surfaces are shaped and sized to fit snugly but slidably between the flanges 20, 22 of the female roll in a close tolerance interfitting relationship. Additionally, the larger male roll surface 30 extends very slightly below, i.e., is offset below, the surface of the neighboring larger diameter roll surface 26 of the female roll by a sufficient amount to produce a clean parting of the metal. In the examples of substrip production discussed further below, this offset distance is approximately 0.010 of an inch. As viewed in FIG. 1, the rolls of the invention will be seen to define at the nips a pair of axially spaced and radially offset rectangular nip chambers 35 and 37 formed by the surfaces 24, 26, 28, 30 and by the inner surfaces 21 and 23 of the side flanges 20, 22, and by the radial surfaces 29 and 31 between the respective stepped roll surfaces. Into these chambers, or nips, is fed the metal strip 32 to be slit. These multiple rectangular chambers define a confining rolling zone 33 (FIG. 3) through which the metal is passed and in which the whole cross section of metal becomes worked, as will be described. There is no effective communication between these chambers 35 and 37 for producing a clean parting of the metal into substrips.

The radially extending surface 29 between the stepped roll surfaces 24 and 26 of the female roll 10 is smooth and flat and extends perpendicular to the roll axis 25. Similarly, the radially extending surface 31 between the stepped roll surfaces 28 and 30 of the male roll 12 is smooth and flat and extends perpendicularly to the roll axis 27. It is to be understood that in accordance with good rolling mill structural practice the junctures between the radial surfaces 21, 23, 29, 31 and the contiguous roll surfaces 24, 26, 28 and 30 may be rounded very slightly to avoid sharp corners.

Mounted against the housing of drive means 18 by means of suitable fastening means such as a bolt 34 and located on the "downstream" side of the rolls is a stripper 36. This stripper has flat, parallel upper support surfaces 38, 40 which are tangent, respectively, to the roll surfaces 24, 26, and it has an arcuate surface 42 lying closely adjacent to the roll surface 26 and a similar arcuate surface 43 lying closely adjacent to the roll surface 24.

The metal work strip 32 to be parted longitudinally into at least two resultant substrips is inserted into the roll nips from right to left as viewed in FIG. 2. It is to be understood that the pass line of the rolling mill extends in the longitudinal direction of the work strip 32. This strip 32 is formed of malleable metal and has a width closely approximating the lateral spacing between the surfaces 21 and 23 of flanges 20, 22, and its thickness is uniform and is significantly greater than the nips; that is, the spacing between the respective opposed roll surfaces 24 and 30; 26 and 28, and these nips have equal spacing. Accordingly, the metal is confined on all sides and is squeezed tightly, as shown in FIG. 3, and is subjected to compression force, becoming worked and reduced in thickness across its entire width.

Simultaneously with this applied compression and working, the malleable metal is forced through the multiple separate nip chambers, completely filling them and emerging as resulting substrips 32a, 32b. As shown in FIG. 3, one longitudinal portion 32-1 of the work strip is displaced in a direction generally perpendicular to the plane of the work strip with respect to another longitudinal portion 32-2. These two longitudinal portions 32-1 and 32-2 each become effectively completely confined within the rectangular chambers in the rolling zone, and their thickness is significantly reduced to form the respective substrips 32a and 32b.

The opposed pairs of roll surfaces 24 and 30; 26 and 28 actually serve to apply longitudinally directed forces to the metal for driving the metal through the confining rolling zone 33 as shown by the arrows F in FIG. 3. In other words, these rolls 10 and 12 provide the propelling force to the metal, and there is no need for a downstream stand of take-up or pulling rolls. In the preferred form, both rolls are driven to equalize the forces on the metal strip. However, it would not depart from the inventive concept if one roll were an idler. In FIG. 2, there is schematically shown drive means 33 mechanically connected by coupling means 39 to drive both shafts 14 and 16.

The substrips 32a, 32b are effectively totally confined on all sides while simultaneously being subjected to significant compression force within the confines of the nips between the flanges 20, 22, and the respective radial surfaces 31 and 29. It is the function of stripper 36 to free the substrips from the female roll 10. This stripper penetrates between the substrips and the working roll surfaces 24, 26 to prevent the substrips from clinging and wrapping around the female roll 10.

FIG. 4 illustrates the changed condition of the work strip 32 as a result of passing through the roll nips. Compression region 44 will be seen to extend completely across the width of the strip with the simultaneous formation of a slit 46.

In one actual example, aluminum strip 0.747 inch wide and 0.055 inch thick was rolled and parted into two thinner resultant substrips, each 0.375 inch wide by 0.044 inch thick. Excellent edge quality of both edges of both substrips was achieved. The edges each appeared to have a generally polished finish, attractively smooth without burrs. In this example the original cross sectional area of the aluminum was 0.0411 square inch, and the sum of the cross-sectional areas of the two resultant aluminum substrips was 0.033 square inch, thereby being a reduction in total cross sectional area of 19.7%.

Similar desirable qualities were observed with lead which began as a work strip 0.750 inch wide by 0.055 inch thick and was rolled and parted into two thinner substrips, each 0.375 inch wide by 0.040 inch thick. In this example the original cross sectional area of the lead work strip was 0.0413 square inch, while the sum of the substrip cross sectional area was 0.030 square inch, thus being a reduction in total cross-sectional area of 27.3%.

As a result of the compressive forces and significant working being exerted completely across the width of the strip, resulting mechanical properties become effectively homogeneous across each of the resultant substrips 32a and 32b such that camber is avoided. As a result, the principles of this invention may also be employed to trim a single edge while significantly reducing the resultant strip thickness without introducing a camber problem, but it is more economic to start with a work strip which is sufficiently wide in the first instance that two resultant substrips can be produced of sufficient width for each of them to be commercially useful. This might be accomplished, for example, by the modified rolls shown in FIG. 5 wherein the female roll 10' and the male roll 12' define a major rectangular nip chamber 48 and a minor rectangular nip chamber 50 for producing two resultant substrips of different widths.

It will now be apparent to those skilled in the art that all the problems faced in the prior art are overcome by the present invention. These problems included the inability of slitting one edge of a strip due to camber, the need for pulling the strip through the slitter, and various edge problems and defects. By means of the present invention, the strip is effectively totally confined and subjected to compression force across its full width, becoming significantly worked and reduced in thickness, accomplishing the functions of reducing thickness to the desired gage, slitting to width, and simultaneously driving the product by the rolls themselves. It will also be apparent to those skilled in the art that variations and modifications may be made in the apparatus for employing the invention without departing from its spirit and scope.

As used herein, the terms "top" and "above," "bottom" and "below" are each intended to be interpreted broadly to include corresponding equivalent relationships depending upon the orientation of the mill rolls and of the pass line. In the illustrative embodiments, the parallel roll axes 25 and 27 extend horizontally, and the pass line of the metal work strip extends in a horizontal direction between the rolls. Thus, it is convenient to use the above terms in describing these illustrative embodiments. However, it is to be understood that the roll axes may extend vertically or even at an angle of 45° or at some other angle, depending upon the orientation of the mill, and the pass line may extend in other directions rather than horizontally. Consequently, the plane of the work strip may assume any orientation with respect to a horizontal plane. A horizontal pass line, as shown, with the plane of the workstrip being horizontal, as shown, is my presently preferred orientation.

The rolls 10 and 12 are mounted upon shafts 14 and 16 which are supported in cantilevered relationship by suitable bearings in the housing 18. If desired, the shafts 14 and 16 can be supported from both ends.

Although only two substrips 32a and 32b are shown, it will be understood that three or more substrips can be simultaneously produced, if desired, by appropriate staggering of the stepped, interfitting mating roll surfaces.

The clearances between the interfitting mating portions of the male and female rolls must be sufficiently small (while still avoiding undue rubbing contact) to provide effective total peripheral confinement of the metal in each of the rectangular nip chambers 35 and 37 or 48 and 50. In other words, reasonably precise dimensioning is desired. In the above examples with aluminum and lead strip, the axial spacing between the radial flange surface 21 and 23 was a minimum of 0.0002 of an inch greater than the axial distance across the two male roll surfaces 28 and 30. This spacing is approximately evenly divided on each side of the male roll.

The manner in which this clearance on each side is practicably obtained is to provide axial thrust bearings for one of the shafts 14 or 16 to prevent this shaft from moving in an axial (lateral) direction. Then the other shaft is arranged to be free to move somewhat axially (laterally), and it is stabilized in its axial position by the interfitting relationship of the male and female rolls. In this particular embodiment, as shown in FIGS. 1, 2 and 3, the axial thrust bearings were mounted on the shaft 14 for the female roll.

The axial clearance between the radial surfaces 29 and 31 is of the same order of magnitude as that at each side of the male roll.

As described and illustrated, the invention employs a female roll 10 and a male roll 12, the female roll being characterized by having a pair of flanges 20, 22. However, it is not absolutely necessary that there be male and female rolls so long as the functions of the flanges 20, 22 are retained. Thus, for example, the flange 20 on roll 10 could be eliminated and its function replaced by a flange on roll 12. However, the preferred embodiment is as shown, because putting both flanges on the same roll enables axial thrust bearings to be omitted from one of the shafts and enables the desired close clearance tolerances to be maintained more practicably.

The phrases "significant reduction in thickness," "significantly reducing the thickness," "significantly reducing the total cross-sectional area" and similar phrases are intended to convey the meaning that the malleable metal has been similarly worked, as shown in FIG. 4 at 44 across its full width (across the full width of each substrip) to a sufficient extent to avoid noticeable camber in either substrip. This lack of camber also means that the roll axes 25 and 27 are mounted to be accurately aligned with each other. In the examples above the reduction in total cross-sectional area was twenty percent or so. However, in my experience a reduction in total cross-sectional area of at least ten percent will usually be sufficient to avoid camber in the resultant substrips and to produce commercially attractive and acceptable edge quality. Also, the accuracy in the tolerances of the entering work strip 32 should be reasonably good because the accuracy in the formation of the resultant substrips is dependent, among other things, upon such accuracy.

In view of the fact that the parting rolls 10 and 12 are also serving as the final stand of the rolling mill, it is usually advantageous to achieve a reduction in thickness which is more than the minimum amount needed to avoid camber in the substrips. Furthermore, in many rolling mills the reduction provided by these parting rolls will be set at a value above twenty percent in order to obtain the most economical reduction pass schedule for the overall mill as a whole.

In FIG. 3, the longitudinal portion 32-1 of the strip is illustrated as being displaced transversely, i.e., upwardly, while the other longitudinal portion 32-2 is illustrated as travelling along in the direction of the pass line without noticeable transverse displacement. This representation is shown for purposes of clarity of illustration. It is to be understood that in actual practice transverse displacement, i.e., upwardly and downwardly, to a greater or lesser extent with respect to the pass line may occur in each of the longitudinal portions, depending upon their relative individual widths.

As a practical matter, the work strip 32 should have sufficient width relative to its thickness (i.e., a sufficient aspect ratio) that it is reasonably feedable by the roll nips. Thus, as a practical matter, the strip width should be at least several times its thickness. Accordingly, the foregoing description is to be construed as illustrative only, rather than limiting. This invention is limited only by the scope of the following claims.

I claim:

1. The method of slitting one metal strip of predetermined thickness and a width at least several times its thickness into a plurality of substrips in a rolling zone which comprises:
    compressively working said strip across its entire width in one rolling zone, thereby reducing its thickness; and
    in the same rolling zone separating said strip along at least one plane perpendicular to its major surfaces and parallel to its longitudinal centerline by displacing the metal on opposite sides of each such plane in opposite directions perpendicular to said major surfaces for offsetting the portions of the metal on opposite sides of each such plane above and below each other for forming a plurality of substrips each of which is thinner than said strip.

2. The method of claim 1 wherein:
    said plurality is two.

3. The method of claim 1 wherein
    said plurality of substrips are of substantially equal width.

4. The method of slitting one metal strip of predetermined thickness and having a width at least several times its thickness into at least two completely separated substrips without subsequently trimming their edges which comprises:
    rolling and reducing said strip across its full width between a pair of metal working rolls having at least two axially adjacent, radially displaced nips formed between said pair of rolls,
    said nips being totally radially displaced, one from another, in a direction perpendicular to the plane of the entering strip with the bottom of one nip being above the top of the adjacent nip;
    restraining the width of said strip during said rolling and reducing between said pair of rolls for providing at least two substrips,
    each of said separated substrips being significantly thinner than the original strip.

5. The method of claim 4 wherein:
    said nips define at least first and second chambers totally radially displaced to have no effective communication therebetween.

6. The method of both rolling and slitting a metal strip having a width at least several times as large as its thickness between two rolls which comprises:
    providing a first metal working roll rotatable about a first axis and having first and second adjacent cylindrical metal working surfaces of different diameters between first and second peripheral side flanges with a first radial surface extending between said working surfaces;
    providing a second metal working roll rotatable about a second axis parallel to said first axis, said second roll extending between the flanges of said first roll and having third and fourth adjacent cylindrical metal working surfaces equally spaced, respectively, from and in opposed relation to said first and second metal working surfaces, with a second radial surface extending between said third and fourth working surfaces;
    passing such a metal strip into the chambers defined between said metal working surfaces and peripheral side flanges and said radial surfaces of said two rolls, said strip having a uniform thickness greater than the equal spacing between respective opposed working surfaces; and
    driving said rolls to extrude said strip in the form of first and second separated and rolled substrips emerging from between said two rolls.

7. The method of claim 6 wherein:
    the sum of the cross-sectional areas of said extruded substrips is less than the cross-sectional area of the strip prior to entry between said two rolls.

8. The method of rolling metal strip and also parting it into at least two resultant substrips by passing the strip through one confining rolling zone comprising the steps of:

providing a work strip of malleable metal having a predetermined width and thickness, with its width being at least several times greater than its thickness;

introducing one end of the strip into a confining rolling zone;

driving the metal of the strip longitudinally through the rolling zone by applying longitudinally directed rolling forces to at least one surface of the metal in the rolling zone;

in the rolling zone displacing at least two longitudinal portions of the strip relatively transversely with respect to each other in a direction generally perpendicularly to the plane of the work strip;

in the rolling zone effectively confining the entire cross-sectional area of the metal and, while being confined, significantly reducing the thickness of each of these longitudinal portions while also continuing transversely displacing these longitudinal portions relative to each other for displacing the bottom of at least one portion above the top of an adjacent portion for parting them to form multiple substrips issuing from said rolling zone;

said substrips each being thinner than said work strip; and the sum of their cross-sectional areas being significantly less than the cross-sectional area of the work strip upstream from said rolling zone, whereby said work strip is parted into at least two resultant substrips each of which is thinner than said work strip and each of which is travelling downstream from the rolling zone without commercially unacceptable camber.

9. The method of rolling metal strip and also parting it into at least two resultant substrips by passing the strip through one confining rolling zone, as claimed in claim 8, in which:

each edge of each resultant substrip has commercially acceptable attractive quality, without requiring subsequent upgrading treatment of any of these edges.

10. The method of rolling metal strip and also parting it into at least two resultant substrips by passing the strip through one confining rolling zone, as claimed in claims 8 or 9, in which:

the sum of the widths of the resultant substrips is equal to the width of the work strip, within minor tolerance variations.

11. The method of rolling metal strip and also parting it into at least two resultant substrips by passing the strip through one confining rolling zone, as claimed in claims 8 or 9, in which:

the malleable metal of said work strip is reduced at least 10% in cross-sectional area while passing through said confining rolling zone.

12. The method of rolling a strip of malleable metal and also parting it into multiple resultant substrips by passing the metal of the strip through one confining rolling zone, comprising the steps of:

providing a work strip of malleable metal having a predetermined width and thickness and wherein the width is at least several times greater than its thickness, introducing one end of said work strip into a confining rolling zone, propelling the malleable metal of said work strip through said confining rolling zone in a direction which extends generally longitudinally with respect to said work strip by applying longitudinally directed rolling force upon the metal in said zone, while said malleable metal is entering and is within said confining rolling zone;

(a) displacing at least two longitudinal portions of said metal transversely with respect to neighboring longitudinal portions, (b) significantly reducing the total cross-sectional area of the metal in passing through said zone, and (c) simultaneously laterally confining the opposite edges of each of said transversely displaced longitudinal portions of the metal in said zone for preventing any significant lateral displacement of the metal, the amount of transverse displacement of said longitudinal portions of said metal with respect to neighboring longitudinal portions being sufficient for offsetting the bottom surface of at least one portion above the top surface of a neighboring portion for completely parting said longitudinal portions into resultant separate substrips each having a thickness less than the thickness of said work strip, whereby said resultant substrips each have two edges and top and bottom surfaces which are of commercially acceptable quality and of sufficient straightness to be commercially accepted without further treatment.

13. The method of rolling a strip of malleable metal an also parting it into multiple resultant substrips by passing the metal of the strip through one confining rolling zone, as claimed in claim 12, in which:

said bottom surface of said one substrip is offset at least approximately 0.010 of an inch above the top surface of the neighboring substrip.

14. The method of rolling a strip of malleable metal and also parting it into multiple resultant substrips by passing the metal of the strip through one confining rolling zone, as claimed in claim 12, in which:

the total cross-sectional area of the metal in passing through said confining rolling zone is reduced at least 10 percent.

15. The method of rolling a work strip of malleable metal to reduce the thickness of the metal and also parting the work strip into a plurality of substrips by passing such metal through one confining rolling zone, comprising the steps of:

providing a work strip of malleable metal having a predetermined thickness and a width which is at least several times greater than its thickness, passing the metal of said work strip through a confining rolling zone in a direction longitudinally of the work strip, in said rolling zone applying rolling force to the metal of said work strip for driving the metal through said zone, in said rolling zone confining the opposite edges of the metal of said work strip for preventing lateral spreading of the metal, in said rolling zone displacing a plurality of longitudinal portions of the metal transversely with respect to neighboring portions for displacing the respective neighboring portions into non-overlapping relationship for parting the metal into a plurality of separate substrips, and in said rolling zone significantly reducing the thickness of said substrips as compared with the original thickness of said work strip for working the metal across the full width of each of said substrips, thereby preparing a plurality of substrips each of which does not have commercially unacceptable camber.

16. The method of rolling a work strip of malleable metal to reduce the thickness of the metal and also parting whe work strip into a plurality of substrips by passing such metal through one confining rolling zone, as claimed in claim 15, in which:

the edges of each of said substrips have commercially attractive quality without requiring subsequent preparation.

17. Apparatus for both rolling and slitting sheet metal strip between one pair of rollers which comprises:

a first roller rotatable about a first axis and having first and second adjacent, cylindrical metal rolling surfaces of different radii coaxial with said first axis with a first radial surface extending between said rolling surfaces;

a second roller rotatable about a second axis parallel to, and spaced from, said first axis, said second roller having third and fourth adjacent, cylindrical, metal rolling surfaces of different radii coaxial with said second axis with a second radial surface extending between said third and fourth rolling surfaces and defining, with said first and second metal rolling surfaces respectively, first and second nip chambers radially completely offset one from another;

circumferential flange means on at least one of said rollers, said flange means and said radial surfaces laterally enclosing said first and second nip chambers and restraining lateral expansion of metal therein; and means for driving at least one of said rollers to advance metal through said radially offset nip chambers.

18. The apparatus of claim 17 wherein:

said flange means comprise first and second spaced circumferential flanges on said second roller, separated by said third and fourth metal rolling surfaces.

19. The apparatus of claim 17 or 18 wherein:

both of said rollers are driven by said driving means.

20. Apparatus for providing both rolling and slitting of metal strip which comprises:

a first roller rotatable about a first axis and having a plurality of successively adjacent, cylindrical, metal rolling surfaces coaxial with said first axis, said adjacent metal rolling surfaces having different radii;

a second roller rotatable about a second axis parallel to, and spaced from, said first axis, said second roller having a plurality of successively adjacent, cylindrical, metal rolling surfaces coaxial with said second axis, the adjacent metal rolling surfaces having different radii and defining, with the metal rolling surfaces of said first roller, a plurality of nip chambers, the adjacent nip chambers being totally radially displaced one from another to have no effective communication therebetween;

circumferential flange means on at least one of said rollers for enclosing said plurality of nip chambers and restraining lateral expansion of metal therein; and means for driving at least one of said rollers to advance metal through said nip chambers.

21. Apparatus for providing both rolling and slitting of sheet metal strip as claimed in claim 20, in which:

said one roller has a pair of axially spaced flanges which closely straddle the perimeter of the other roller, only one of said rollers is mounted to prevent its axial movement with the other roller being axially movable, and the straddling relationship of said flanges maintains the two rollers in axial alignment.

22. Apparatus for producing both rolling and slitting of flat metal strip which comprises:

a first roller rotatable about a first axis and having first and second adjacent, cylindrical metal rolling surfaces of different radii coaxial with said first axis;

a second roller rotatable about a second axis parallel to, and spaced from, said first axis, said second roller having third and fourth adjacent, cylindrical, metal rolling surfaces of different radii coaxial with said second axis and defining, with said first and second metal rolling surfaces respectively, first and second nip chambers totally radially displaced one from another to have no effective communication therebetween;

a circumferential flange means on said second roller for enclosing said first and second nip chambers and restraining lateral expansion of metal therein;

means for driving at least one of said rollers to advance the metal of such strip through said nip chambers; and means for stripping worked metal from said second roller.

23. The method of slitting one metal strip into a plurality of substrips each of which is thinner than said strip, as claimed in claim 1, in which:

said compressive working produces a reduction in total cross-sectional area of at least ten percent as shown by comparing the sum of the cross-sectional areas of the resultant substrips with the cross-sectional area of the original metal strip.

24. The method of slitting one metal strip into a plurality of substrips each of which is thinner than said strip as claimed in claim 1 or 23, in which:

the portions of metal on opposite sides of each such plane are so displaced until the bottom of one substrip is offset at least 0.010 of an inch above the top of the neighboring substrip.

25. Apparatus for producing both rolling and slitting of sheet metal strip between the same pair of rollers which comprises:

a first roller rotatable about a first axis and having first and second adjacent, cylindrical metal rolling surfaces of different radii coaxial with said first axis;

a second roller rotatable about a second axis parallel to, and spaced from, said first axis, said second roller having third and fourth adjacent, cylindrical, metal rolling surfaces of different radii coaxial with said second axis and defining, with said first and second metal rolling surfaces respectively, first and second nip chambers radially displaced from one another;

circumferential flange means on said second roller for enclosing said first and second nip chambers and restraining lateral expansion of metal therein;

means for driving at least one of said rollers to advance metal through said nip chambers; and means for stripping worked metal from said second roller comprising, a fixedly mounted thin-edged extension positioned to penetrate between the third and fourth metal rolling surfaces of said second roller and the worked metal thereon to remove the worked metal from said rollers.

* * * * *